United States Patent
Tscheng

(10) Patent No.: US 11,541,759 B2
(45) Date of Patent: Jan. 3, 2023

(54) ELECTRIC VEHICLE, COMPOSITION OF SEVERAL ELECTRIC VEHICLES AND METHOD FOR OPERATING AN ELECTRIC VEHICLE

(71) Applicant: STADLER RAIL AG, Bussnang (CH)

(72) Inventor: Jorgen Tscheng, Zürich (CH)

(73) Assignee: Stadler Rail AG, Bussnang (CH)

( * ) Notice: Subject to any disclaimer, the term of this patent is extended or adjusted under 35 U.S.C. 154(b) by 133 days.

(21) Appl. No.: 16/953,514

(22) Filed: Nov. 20, 2020

(65) Prior Publication Data

US 2021/0170875 A1    Jun. 10, 2021

(30) Foreign Application Priority Data

Dec. 10, 2019   (EP) ..................................... 19214676

(51) Int. Cl.
*B60L 5/18* (2006.01)
*B60L 3/12* (2006.01)
*H02P 5/74* (2006.01)
*H02P 27/06* (2006.01)

(52) U.S. Cl.
CPC   *B60L 5/18* (2013.01); *B60L 3/12* (2013.01); *H02P 5/74* (2013.01); *H02P 27/06* (2013.01)

(58) Field of Classification Search
None
See application file for complete search history.

(56) References Cited

U.S. PATENT DOCUMENTS

| | | | |
|---|---|---|---|
| 5,331,261 A * | 7/1994 | Brown | ...................... B60L 9/00 246/182 A |
| 5,614,796 A | 3/1997 | Minderlein et al. | |
| 2015/0175105 A1* | 6/2015 | Kyr | ........................... B60L 5/00 307/9.1 |
| 2017/0072804 A1* | 3/2017 | De Miranda | ........... B60L 53/68 |

FOREIGN PATENT DOCUMENTS

| | | |
|---|---|---|
| EP | 0 691 236 A1 | 1/1996 |
| EP | 2 011 685 A1 | 1/2009 |
| EP | 2 810 847 A1 | 12/2014 |
| JP | S59-2501 | 1/1984 |

OTHER PUBLICATIONS

European Search Report Corresponding to 19214676 dated Jul. 3, 2020.

* cited by examiner

*Primary Examiner* — Jared Fureman
*Assistant Examiner* — Aqeel H Bukhari
(74) *Attorney, Agent, or Firm* — Finch & Maloney PLLC

(57) ABSTRACT

An electric vehicle, in particular a rail vehicle, with a current collection device (2). The current collection device has at least one contact device (2a, 2b). An electrically conductive contact, of the current collection device (2) to an external power supply (1), can be achieved by the contact device (2a, 2b). The vehicle comprises a DC link (11) and at least one electric traction motor (10). During normal driving operation, the current is conducted from the current collection device (2), via the DC link (11), into the one of the traction motors (10) and a current connection is formed between the contact device (2a, 2b) and the DC link (11). The current connection is at least partially bidirectional. A disconnecting device (5) is arranged between contact device (2a, 2b) and DC link (11). The disconnecting device (5) is designed to be interrupted unidirectionally.

19 Claims, 2 Drawing Sheets

Figure 1:
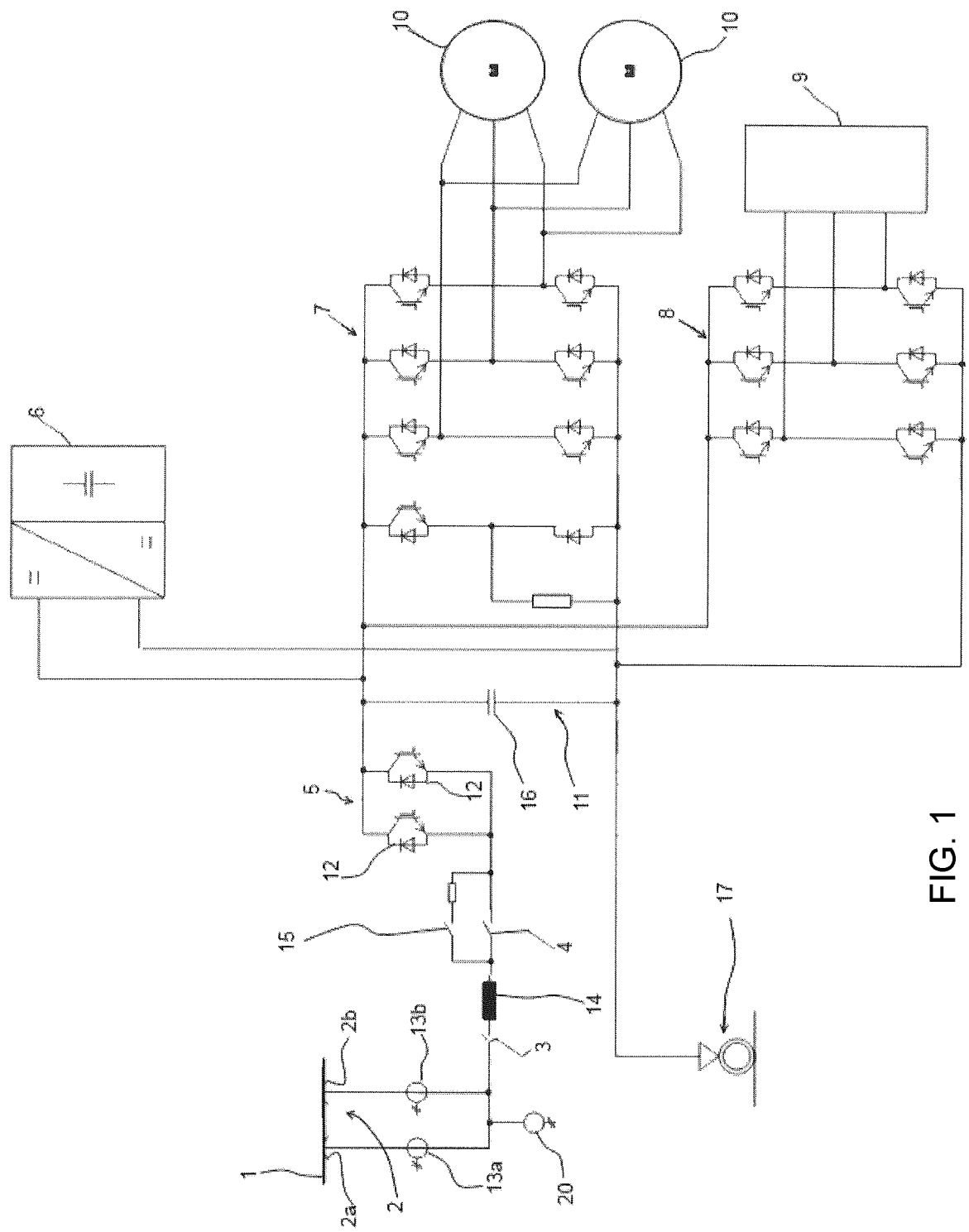

ELECTRIC VEHICLE, COMPOSITION OF SEVERAL ELECTRIC VEHICLES AND METHOD FOR OPERATING AN ELECTRIC VEHICLE

The invention relates to an electric vehicle, a composition of several electric vehicles and a method for operating an electric vehicle.

Electrically powered vehicles, such as rail vehicles, are often powered by an external power supply system such as an overhead contact line. Such power supply systems are often divided into independent supply sections for reasons of grid stability or space. Between these independent power supply sections there are sections without current through which the vehicle has to pass. This has the disadvantage of interrupting the power supply to the auxiliary devices, thus reducing passenger comfort. In addition, this results in a drop in traction load, which leads to an increased stress on the traction components.

EP 0 691 236 provides a method for bridging such gaps in the power supply, in which the vehicle switches to regenerative braking mode and thus supplies power to the auxiliary devices. The disadvantage is that the vehicle is slowed down and that the traction components are more heavily loaded by the load change.

From EP 2 011 685, a drive control system for an electric vehicle is known, whereby batteries are used as a bypass in such an interruption. The current collection unit is disconnected from the power supply system manually or by an external signal by means of a main switch. The disadvantage of this control is that switching is slow and that the main switch is subject to heavy wear.

The object of the invention is thus to remedy these and other disadvantages of the state of the art and, in particular, to prevent a current-free section of a power supply system from being energised via a current collector of the vehicle.

Furthermore, an energy supply of the vehicle is to be ensured also in the current-free sections without putting too much strain on the components of the vehicle. It also aims to prevent inrush phenomena such as electric arcs.

These tasks are solved by an electric vehicle, a composition of several electric vehicles and a procedure for operating an electric vehicle according to the generic term of independent claims.

In particular, the task is solved by an electric vehicle, in particular a rail vehicle, with a current collection device. The current collection device comprises at least one contact device. By means of the contact device, an electrically conductive contact of the current collection device to an external power supply can be achieved. The rail vehicle further comprises a DC link and at least one electric traction motor. During operation, the current is conductable from the current collection device via the DC link into the traction motors and a current connection is formed between the contact device and the DC link. The current connection is at least partially bidirectional. A disconnecting device is arranged between the contact device and the DC link. The disconnecting device is designed in such a way that the power supply can only be interrupted unidirectionally, in particular a current flow in the direction of the external power supply, preferably in the direction of the contact device, is interruptable.

Due to the only unidirectionally interruptible power supply, it is possible for the vehicle to draw power from the external power supply at any time, but optionally not to discharge any power from the vehicle. For example, it is possible to prevent current from the DC link from flowing into a current-free section of the power supply.

In this way it is possible to prevent the current-free section from being unintentionally energised. During normal operation, i.e. when the DC link is supplied with power from the external power supply, the disconnecting device is closed and power can be fed into the external power supply, for example during regenerative braking.

Here, a disconnecting device is understood as a device which allows at least partial interruption of the power connection, for example by reducing the current flow. Preferably, the disconnecting device is designed in such a way that the current connection can be completely disconnected, i.e. no current flow from the vehicle into the current-free section is possible.

An electric vehicle is understood here to be an electrically moving unit.

The current collection device may include a pantograph such as a rod pantograph, for example with a contact shoe or contact roller, a pantograph bracket for connection to a conductor rail or overhead contact line or other suitable collection devices.

The vehicle may include other electrical components, such as additional switches or rectifiers.

Preferably, the disconnecting device is an electronic switch, preferably a semiconductor switch with a free-wheeling diode, especially preferably an IGBT with a free-wheeling diode.

This design is easy to manufacture and not complex.

The disconnecting device may include other suitable disconnecting devices which, when open, interrupt the flow of current from the vehicle to the external power supply. The current flow in the opposite direction should still be possible.

As an alternative to a disconnecting device which completely interrupts the current flow, the vehicle may include a reducing device which, for example, allows only a small current flow into the external power supply during the current-free section. In this way the current flow to the current-free section can be easily reduced.

Preferably, a current storage device is provided, in particular a battery or a capacitor, in particular a supercapacitor. The current storage device is arranged in electrical connection to the DC link. Preferably, the current storage device is connected to the DC link via a step-up converter.

This makes it easy to ensure that the auxiliary and traction operations are supplied with energy. The capacity of the capacitor can preferably be designed for the required power of the vehicle and auxiliary operations and the length of the current-free sections. The capacity of the capacitor may be at least 1 kWh.

A main switch is preferably placed between the contact device and the DC link, preferably between the contact device and the disconnecting device, and especially preferably between the current collection device and the disconnecting device.

This allows the vehicle to be safely disconnected from the external power supply. The contact device and the main switch are connected. Generally, connection or connected is used herein if there is a current-conducting line between the components. The vehicle may include other switches.

Preferably, the current collection device includes a measuring device for current.

This makes it easy to determine whether the disconnecting device needs to be actuated or not.

Preferably, the vehicle is equipped with a data processing device to control the disconnecting device. The disconnecting device may be operable by a user, in particular switchable, and/or automatically operable by the data processing device, in particular switchable, preferably by detecting a measured value of the measuring device.

If the vehicle includes more than one contact device, the measuring device is preferably connected to all contact devices so that current can be measured through all contact devices. For this purpose, the measuring device comprises at least one measuring element for each contact device, which is spaced from the other contact devices in the longitudinal direction of the vehicle, so that an individual measurement of the current through each contact device is possible. If the current is drawn laterally from conductor rails, there are usually two contact devices on the right and left of the vehicle, at essentially the same point in the longitudinal direction. These two contact devices can be connected to a common measuring element. In this way, individual measurements can be taken for each contact device easily and without unnecessary material expenditure. For example, the current collection device can include two contact devices through which current can flow simultaneously. The interruption of the power supply only takes place if the length of the section of the external power supply without power supply is longer than the distance between the two current collecting devices.

Preferably, a detection device is designed to detect interruptions in the power supply. The detection device allows the presence of a power supply interruption to be directly detected and/or position data of a power supply interruption to be processed in the detection device.

In this way, it is easy to determine where there are current-free sections in the power supply network and to react to them in good time.

The detection device may include at least one data receiving device and/or data transmitting device designed to send data to or receive data from other vehicles or from an external data processing device or network, preferably position data of de-energised sections.

The detection device may preferably be connected and/or connectable to the vehicle's internal data processing device so that a circuit of the disconnecting device can be executed according to the received data.

The task is further solved by a composition of several electric vehicles, in particular rail vehicles. At least one electric vehicle as described before is provided.

This allows easy detection of sections current-free sections. The vehicle(s) in front can forward the position data to vehicles behind or to an external location. This allows a simple composition of a position plan of current-free sections.

Furthermore, the task is solved by a method for operating an electric vehicle, in particular a vehicle as described before, especially when driving over current-free sections of an external power supply. The electric vehicle comprises a DC link and a current collection device. The method comprises the following steps:

Detection of a power interruption by means of a detection device,

Interrupting the power supply in the direction of the external power supply by opening a disconnecting device, whereby power supply from the external power supply to the DC link unidirectionally is still possible.

This prevents the current-free section from being unintentionally put under power.

Preferably, after detecting the current interruption, a voltage level of the DC link is raised to a voltage level equal to or higher than the voltage level of the external power supply, in particular to a maximum permissible voltage of the external power supply.

This avoids stressing electrical components by compensating currents due to different external and DC link voltages. In addition, influences of electromagnetic compatibility can be reduced.

Preferably, the detection device detects when the external power supply is restored. In particular, the voltage level in the DC link is reduced after detection of the reinsertion of the external power supply, preferably to a level below the voltage level of the external power supply, and the supply of the intermediate circuit by the battery or recuperation is interrupted. In particular, the disconnecting device is closed again, allowing a bidirectional flow of current.

This allows a low load transition from an internal power supply to an external power supply. In order to detect how the external power supply is used, the detection device measures the external voltage and especially the harmonic components. This is advantageous because at this point in time no current flows into the vehicle due to the higher voltage.

Preferably, the voltage level in the DC link is raised by feeding in braking energy from the traction motors and/or by feeding in energy from an energy storage device.

This allows an optimised design of the power supply.

Preferably, in an electric vehicle with more than one current collection device, the detection of the current interruption takes place at the first current collection device in the direction of travel.

This allows early detection of current-free sections. This is possible, for example, by the reduction of a current drawn by a first contact device, especially compared to a current drawn by a second contact device.

It is preferable to determine a length of the section of the current interruption of the external power supply.

In this way, the switching time of the disconnecting device can be easily determined.

Preferably, a composition as described above includes at least two longitudinally spaced current collection devices. The interruption of the power supply will only occur if the length of the section of the external power supply without power supply is longer than the distance between the two current collection devices.

This prevents unnecessary switching of the circuit breaker in a simple way, thus avoiding unnecessary stress on the vehicle components.

It is preferable to send and/or store the length of the section of the external power supply interruption to another vehicle.

This makes it easy to create a position plan of current-free sections, which enables optimizing switching of the disconnector to be optimised. If, for example, a first vehicle passes through a current-free section and this section can be bridged, i.e. it is always connected to a section of the external power supply having current at least at one point, the second following vehicle can avoid switching the disconnecting device.

The object is further solved by a computer program product. The computer program product comprises the instructions which, when the program is executed by a data processing device, perform a procedure as described above.

The invention is explained using the following figures as examples. It shows

FIG. 1: A plan of an electrical power supply of a vehicle in a first embodiment, FIG. 2: A plan of an electrical power supply of a vehicle in a second embodiment.

FIG. 1 shows a plan of an electrical power supply of a vehicle in a first embodiment. It shows a current collection device 2 with two contact devices 2a, 2b, which bring the vehicle into electrically conductive contact with an external power supply 1.

The contact devices 2a, 2b are each connected to a current transformer 13a, 13b for current measurement. In general, the connection is designed so that a current conducting line is arranged between the components.

The two current transformers 13a, 13b are connected to a main switch 3. An additional voltage transformer 20 is arranged on the line from current transformer 13a to main switch 4.

The main switch 3 is connected to an inductor 14, which in turn is connected to a line contactor 4 and a charging contactor 15 connected in parallel. The line contactor 4 and the charging contactor 15 are connected to the disconnecting device 5. The disconnecting device 5 in this version comprises two parallel connected freewheeling diodes 12.

In an alternative design (not shown here) the two current transformers 13a, 13b can be connected directly or via a fuse to the inductor 14.

The disconnecting device 5 is connected to the DC link 11. The DC link 11 includes a capacitor 16. An energy storage device, here capacitance 6, is connected in parallel with the DC link 11 and connected to it via a step-up converter 21. The capacitor 6 can take over the power supply of the DC link 11 or be charged via it.

Also shown are two traction motors 10 and auxiliary devices 9. The traction motors 10 are connected to the DC link 11 via a motor converter 7. The auxiliary devices 9 are also connected to the DC-link 11 via auxiliary converters 8.

During normal operation, current is supplied from the external power supply 1 via the current collection device 2 and the DC link 11 to the motors 10 and the auxiliary gears 9. In this case, the isolator 5 is closed, allowing current to be conducted from the current collection device 2 to the DC link 11 and vice versa. When the vehicle now enters a current-free section, the disconnecting device 5 is opened, which prevents current from the DC link 11 from flowing into the external power supply 1. However, it is still possible for current from the external power supply 1 to flow into the DC link 11. This means that the connection between the DC link 11 and the external power supply is unidirectionally interrupted. The motors 10 and the auxiliaries 9 are supplied with power by the capacitor 6 via the DC link 11.

After passing through the current-free section, the disconnecting device 5 is closed again, and current can now flow bidirectionally again. Capacity 6 is recharged via the DC link.

Furthermore, a ground brush 17 for the reverse current is shown.

Figure 2:
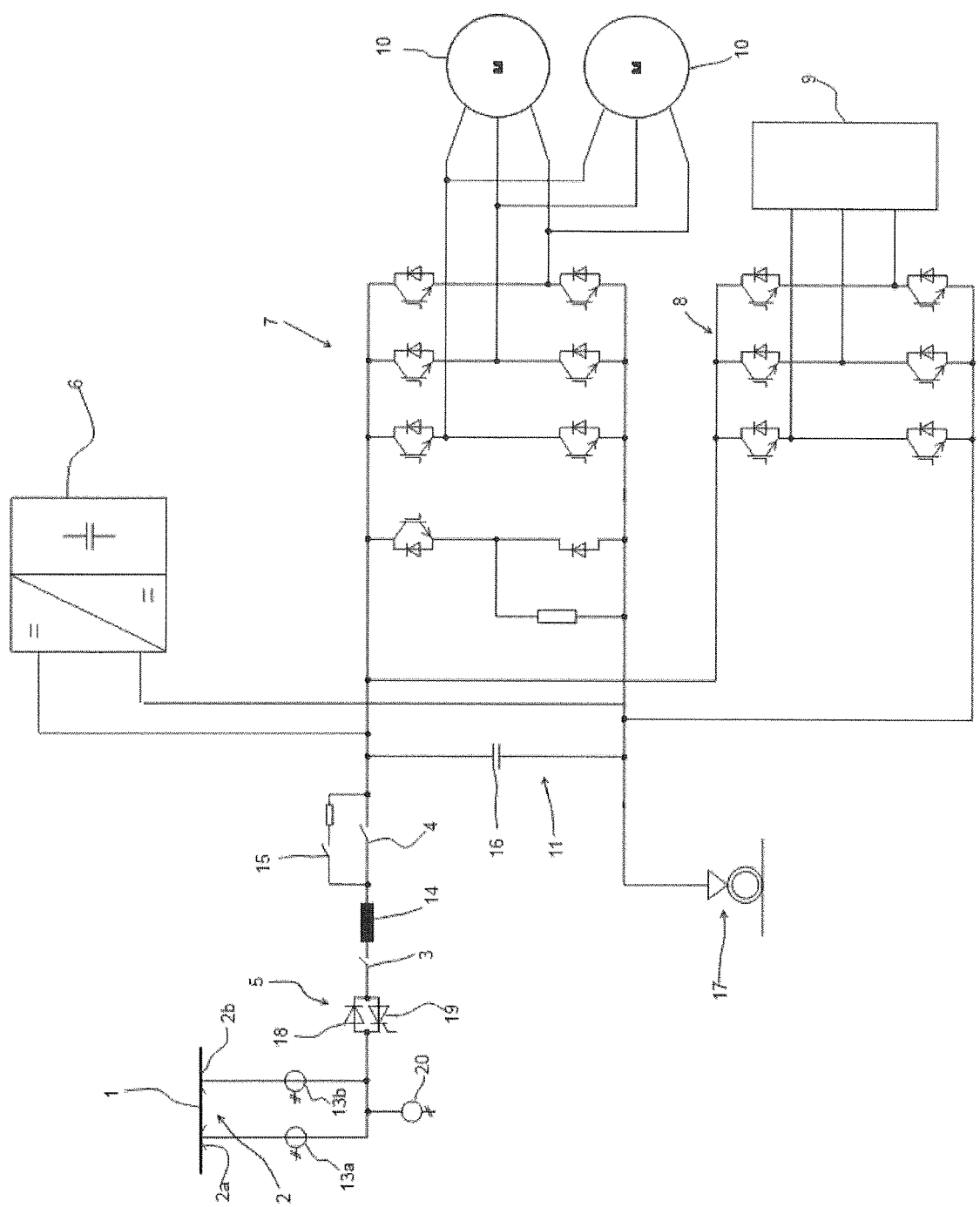

FIG. 2 shows a plan of an electrical power supply of a vehicle in a second version. Only the differences to the first version are explained here.

The disconnecting device 5 in this version is located between the current transformers 13a, 13b and the main switch 3. The disconnecting device here comprises a freewheeling diode 18, which is connected in parallel with an IGBT switch.

The invention claimed is:

1. An electric vehicle with a current collection device having at least one contact device, wherein by means of the at least one contact device an electrically conductive contact of the current collection device to an external power supply can be achieved,
a DC link,
at least one electric traction motor,
the current from the current collection device can be conducted, via the DC link, into the at least one electric traction motor during a traction operation, and a current connection is provided between the at least one contact device and the DC link, and the current connection being at least partially bidirectional, and
a disconnecting device is arranged between the at least one contact device and the DC link, and the disconnecting device is designed in such a way that the power supply can only be interrupted unidirectionally and wherein an energy storage device is provided and the energy storage device is arranged in electrical connection to the DC link.

2. The electric vehicle according to claim 1, wherein the disconnecting device is an electronic switch.

3. The electric vehicle according to claim 1, wherein a main switch is arranged between the at least one contact device and the DC link.

4. The electric vehicle according to claim 1, wherein the current collection device comprises a measuring device for current.

5. The electric vehicle according to claim 1, wherein a detection device is designed to detect power supply interruptions, it being possible to detect the presence of a power supply interruption directly by the detection device and/or to process position data of a power supply interruption in the detection device.

6. A composition of several electric vehicles wherein at least one electric vehicle is provided according to claim 1.

7. A method for operating an electric vehicle according to claim 1, wherein the electric vehicle comprises a DC link and a current collection device, comprising the following steps:
detecting a power interruption with a detection device,
interrupting the power supply in a direction of the external power supply by opening a disconnecting device, whereby a power supply from the external power supply to the DC link is still unidirectionally possible.

8. The method according to claim 7, wherein after detection of the current interruption, a voltage level of the DC link is raised to a voltage level equal to or higher than the voltage level of the external power supply up to a maximum permissible voltage of the external power supply.

9. The method according to claim 7, wherein a restart of the external power supply is detected by the detecting device and a voltage level in the DC link is reduced after detecting the restart of the external power supply, whereby the disconnecting device is closed again so that a bidirectional current flow is possible.

10. The method according to claim 7, wherein raising of the voltage level in the DC link takes place by feeding in braking energy from the at least one electric traction motor and/or by feeding in energy from an energy storage device.

11. The method according to claim 7, wherein, in the case of an electric vehicle with more than one current collection device, the detection of the current interruption takes place at the current collection device arranged at a front in a direction of travel.

12. The method according to claim 7, wherein a length of a section of the power interruption of the external power supply is determined.

13. The method according to claim 7, wherein a composite comprises at least two longitudinally spaced current collection devices and the interruption of the power supply only takes place if a length of a section of the external power supply without power supply is longer than a distance between the two current collection devices.

14. The method according to claim 7, wherein a length of a section of the power interruption of the external power supply is transmitted to another vehicle and/or stored.

15. An electric vehicle according to claim 1, wherein a current flow in a direction of the external power supply can be interrupted.

16. The electric vehicle according to claim 1, wherein the energy storage device is a battery, a capacitor or a supercapacitor.

17. The electric vehicle according to claim 1, wherein a current storage device is connected to the DC link via a step-up converter.

18. The electric vehicle according to claim 1, wherein the main switch is arranged between the current collection device and the disconnecting device.

19. The method according to claim 7, wherein the voltage level in the DC link is reduced, after detecting the restart of the external power supply, to a level below the voltage level of the external power supply.

* * * * *